(12) United States Patent
Eriksson et al.

(10) Patent No.: US 9,924,542 B2
(45) Date of Patent: Mar. 20, 2018

(54) RANDOM ACCESS PROCEDURES FOR MACHINE-TYPE COMMUNICATIONS

(71) Applicant: Telefonaktiebolaget L M Ericsson (publ), Stockholm (SE)

(72) Inventors: Erik Eriksson, Linköping (SE); Johan Bergman, Stockholm (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 84 days.

(21) Appl. No.: 14/670,507

(22) Filed: Mar. 27, 2015

(65) Prior Publication Data

US 2015/0282215 A1 Oct. 1, 2015

Related U.S. Application Data

(60) Provisional application No. 61/971,348, filed on Mar. 27, 2014.

(51) Int. Cl.
*H04W 74/08* (2009.01)

(52) U.S. Cl.
CPC ............................. *H04W 74/0833* (2013.01)

(58) Field of Classification Search
CPC .............................................. H04W 74/0833
See application file for complete search history.

(56) References Cited

U.S. PATENT DOCUMENTS

2011/0170499 A1* 7/2011 Nayeb Nazar ........ H04L 1/1812
370/329
2013/0058315 A1* 3/2013 Feuersanger ....... H04W 52/281
370/336
2013/0083753 A1* 4/2013 Lee ................... H04W 72/0453
370/329

(Continued)

FOREIGN PATENT DOCUMENTS

| WO | 2008024788 A2 | 2/2008 |
|----|---------------|--------|
| WO | 2013104118 A1 | 7/2013 |

OTHER PUBLICATIONS

Gao W0 2013/104118.*

(Continued)

*Primary Examiner* — Yemane Mesfin
*Assistant Examiner* — Henry Baron
(74) *Attorney, Agent, or Firm* — Patent Portfolio Builders, PLLC

(57) ABSTRACT

Systems and methods relating to transmission and reception of a Random Access Response (RAR) message to a wireless device (e.g., a User Equipment (UE)) in a manner that is particularly well-suited for, but not limited to, reduced bandwidth devices, such as Machine Type Communication (MTC) devices, are disclosed. In some embodiments, a method of operation of a wireless device to perform random access to a cellular communications network comprises transmitting a random access preamble on a physical random access channel and determining, from a random access preamble index of the random access preamble, one of a random access response resource and a channel to monitor for a transmission of an indication of the random access response resource. The method further comprises receiving a random access response on the random access response resource.

35 Claims, 12 Drawing Sheets

(56) References Cited

U.S. PATENT DOCUMENTS

2013/0242730 A1   9/2013   Pelletier et al.
2014/0092842 A1*  4/2014   Ahn .................... H04L 5/003
                                                    370/329

OTHER PUBLICATIONS

Author Unknown, "RP-140522: Revised Work Item on Low cost and enhanced coverage MTC UE for LTE," 3rd Generation Partnership Project (3GPP), TSG RAN Meeting #63, Mar. 3-6, 2014, 7 pages, Fukuoka, Japan.

Author Unknown, "Technical Specification Group Radio Access Network; Evolved Universal Terrestrial Radio Access (E-UTRA); Physical channels and modulation (Release 12)," Technical Specification 36.211, Version 12.1.0, 3GPP Organizational Partners, Mar. 2014, 120 pages.

Ericsson, "R1-144559: Physical resource allocation for MTC," 3rd Generation Partnership Project (3GPP), TSG RAN WG1 Meeting #79, Nov. 17-21, 2014, 3 pages, San Francisco, USA.

Ericsson, "R1-150026: RAR transmission for MTC," 3rd Generation Partnership Project (3GPP), TSG RAN WG1 Meeting #80, Feb. 9-13, 2015, 5 pages, Athens, Greece.

Ericsson, "R1-150030: PRACH Repetition for MTC," 3rd Generation Partnership Project (3GPP), TSG RAN WG1 Meeting #80, Feb. 9-13, 2015, 4 pages, Athens, Greece.

Ericsson, "R2-150456: Random access procedure for low complexity and coverage enhanced UEs," 3rd Generation Partnership Project (3GPP), TSG-RAN WG2 #89, Feb. 9-13, 2015, 7 pages, Athens, Greece.

ZTE, "R1-141412: PDSCH PRB locations for common channels and unicast transmissions for low cost MTC UEs," 3rd Generation Partnership Project (3GPP), TSG RAN WG1 Meeting #76bis, Mar. 31-Apr. 4, 2014, 8 pages, Shenzhen, China.

International Search Report and Written Opinion for International Patent Application No. PCT/IB2015/052286, dated Jul. 13, 2015, 13 pages.

* cited by examiner

RANDOM ACCESS PROCEDURES FOR MACHINE-TYPE COMMUNICATIONS

RELATED APPLICATIONS

This application claims the benefit of provisional patent application Ser. No. 61/971,348, filed Mar. 27, 2014, the disclosure of which is hereby incorporated herein by reference in its entirety.

TECHNICAL FIELD

This disclosure pertains to random access procedures for Machine Type Communication (MTC), and more particularly, to random access procedures for low cost Long Term Evolution (LTE) User Equipment (UE) targeting MTC.

BACKGROUND

In Third Generation Partnership Project (3GPP) Long Term Evolution (LTE), as in any communications system, a mobile terminal, or User Equipment (UE), may need to contact the network (via a base station, or an enhanced or evolved Node B (eNB)) without having a dedicated uplink resource from the UE to the base station. To handle this, a random access procedure is available where a UE that does not have a dedicated uplink resource may transmit a signal to the base station. The first message of the random access procedure, which in LTE is a random access preamble, is typically transmitted on a special resource reserved for random access. In LTE, this resource reserved for random access is referred to as a Physical Random Access Channel (PRACH). This PRACH can, for instance, be limited in time and/or frequency. FIG. 1 is a schematic diagram illustrating an example of a random access preamble transmission on a PRACH in LTE.

For random access, the UE performs a cell search procedure whereby the UE detects a cell by using Primary and Secondary Synchronization Signals (PSS/SSS). The UE blindly searches for a number of different sequences and the detected sequences give a Physical Cell Identifier (PCI) of a detected cell. After detecting the cell, the UE reads a Master Information Block (MIB) transmitted on a Physical Broadcast Channel (PBCH) occupying a known resource. The MIB gives the UE information about a System Frame Number (SFN) and how to detect further system information. More detailed system information is then provided in a number of System Information Blocks (SIBs). The first SIB (SIB1) contains a cell identity of the cell and scheduling information on how to decode the following SIBs.

Information about the resources available for PRACH transmission is provided to the UE as part of the broadcasted system information in a second SIB (SIB2) (or as part of dedicated Radio Resource Control (RRC) signaling in case of, e.g., handover). The resources available for PRACH transmission consist of available preamble sequences and a time/frequency resource. In each cell, there are 64 preamble sequences available. Two subsets of the 64 preamble sequences are defined, where the set of preamble sequences in each subset is signaled as part of the system information. The time/frequency resources are also associated to Random Access Radio Network Temporary Identifier (RA-RNTI) in the following fashion:

$$\text{RA-RNTI}=1+t\_id+10*f\_id$$

where t_id is an index of a first subframe of the specified PRACH ($0 \le t\_id < 10$), and f_id is an index of the specified PRACH within that subframe, in ascending order of frequency domain ($0 \le f\_id < 6$). The RA-RNTI associated with random access preamble transmission identifies the time and frequency resources used for transmission of the random access preamble.

According to 3GPP Technical Specification (TS) 36.211 version 12.1.0, the random access preambles are generated from one or several Zadoff-Chu sequences. The set of 64 preamble sequences in a cell is found by including the available cyclic shifts from each Zadoff-Chu sequence and adding more Zadoff-Chu sequences as needed. The number of cyclic shifts in a Zadoff-Chu sequence depends on the number of samples of the cyclic shift (Ncs) given by the zero correlation zone configuration and whether unrestricted or restricted sets of cyclic shifts are used. The sequences to use and the number of cyclic shifts to use per sequence are signaled in the system information.

When performing a (contention-based) random access attempt, the UE selects at random one sequence in one of the subsets. The set from which the sequence is selected may depend on various factors intended to communicate some information to the base station (e.g., LTE currently defines two subsets where the selected subset informs the base station about the amount the amount of data that the UE would like to transmit on the Uplink Shared Channel (UL-SCH) in the third random-access step). As long as no other UE is performing a random access attempt using the same sequence at the same time instant, no collisions will occur and the attempt will, with a high likelihood, be detected by the base station.

In LTE, the random access procedure can be used for a number of different reasons. Among these reasons are:
- Initial access (for UEs in the RRC_IDLE state)
- Incoming handover
- Resynchronization of the uplink
- Scheduling request (for a UE that is not allocated any other resource for contacting the base station)
- Positioning The contention-based random access procedure used in LTE Release 10 is illustrated in FIG. 2. FIG. 2 is a diagram showing signaling over the air interface for the contention-based random access procedure in LTE. The UE starts the random access procedure by randomly selecting one of the random access preambles available for contention-based random access (step 100). The UE then transmits the selected random access preamble on the PRACH to the LTE Radio Access Network (RAN) for reception by an eNB (step 102).

The RAN (specifically an eNB) acknowledges any random access preamble that it detects by transmitting a random access response (MSG2) including an initial grant to be used on the uplink shared channel, a Temporary Cell Radio Access Network Temporary Identifier (TC-RNTI), and a Time Alignment (TA) update based on the timing offset of the preamble measured by the eNB on the PRACH (step 104). The MSG2 is also referred to herein as a Random Access Response (RAR) or RAR message. The MSG2 is transmitted in the downlink to the UE using the Physical Downlink Shared Channel (PDSCH), and the corresponding Physical Downlink Control Channel (PDCCH) message that schedules the PDSCH contains a Cyclic Redundancy Check (CRC) which is scrambled with the RA-RNTI.

When receiving the RAR, the UE uses the grant to transmit a message (MSG3) that in part is used to trigger the establishment of RRC and in part to uniquely identify the UE on the common channels of the cell (step 106). The TA command provided in the RAR is applied in the uplink transmission in MSG3.

In addition, the eNB can also change the resources blocks that are assigned for a MSG3 transmission by sending an uplink grant that has its CRC scrambled with the TC-RNTI which was included in MSG2 (step 108). In this case the PDCCH is used to transmit the Downlink Control Information (DCI) containing the uplink grant.

MSG4, which is then contention resolving, has its PDCCH CRC scrambled with the C-RNTI if the UE previously has a C-RNTI assigned (step 110). If the UE does not have a C-RNTI previously assigned, its PDCCH CRC is scrambled with the TC-RNTI obtained from MSG2. In the first case the UE included C-RNTI into MSG3 whereas in the latter case it included a core network identifier.

The procedure ends with the RAN solving any preamble contention that may have occurred for the case where multiple UEs transmitted the same preamble at the same time (step 112). This can occur since each UE randomly selects when to transmit and which preamble to use. If multiple UEs select the same preamble for the transmission on the Random Access Channel (RACH), there will be contention between these UEs that needs to be resolved through the contention resolution message (MSG4). The case when contention occurs is illustrated in FIG. 3, where two UEs transmit the same preamble (p5) at the same time. A third UE also transmits at the same RACH, but since it transmits with a different preamble (p1) there is no contention between this UE and the other two UEs.

The UE can also perform non-contention-based random access. A non-contention-based random access or contention free random access can, e.g., be initiated by the eNB to get the UE to achieve synchronization in the uplink. The eNB initiates a non-contention-based random access either by sending a PDCCH order or indicating it in an RRC message. The later of the two is used in case of handover to another cell.

The eNB can also order the UE through a PDCCH message to perform a contention-based random access. The procedure for the UE to perform contention free random access is illustrated below and in FIG. 4. Similar to the contention-based random access the MSG2 is transmitted in the downlink to the UE and its corresponding PDCCH message CRC is scrambled with the RA-RNTI (steps 200-204). The UE considers the contention resolution successfully completed after it has received MSG2 successfully (step 206). For the contention free random access as for the contention-based random access, the MSG2 contain a timing alignment value. This enables the eNB to set the initial/updated timing according to the UEs transmitted preamble.

FIG. 5a shows the detailed timing of the basic random access preamble. The preamble is prefixed with a Cyclic Prefix (CP) to enable simple frequency domain processing. Its length is in the order of Transmission Gap Period (TGP)+Time Domain Scrambler (TDS)=97.5+5 microseconds ($\mu$s)=102.5 $\mu$s, where TDS corresponds to the maximum delay spread and TGP corresponds to the maximum round trip time. The CP insures that the received signal is always circular (after removing the CP in the random access receiver) and thus can be processed by Fast Fourier Transforms (FFTs). Therefore, the "active" random access preamble duration is 1000 $\mu$s−2·TGP−TDS=800 $\mu$s. The random access subcarrier spacing is 1/800 $\mu$s=1250 Hertz (Hz).

FIGS. 5b through 5d show the extended preamble formats. Format 1 has an extended CP and is suited for cell radii up to approximately 100 kilometers (km). However, since no repetition occurs this format is only suited for environments with good propagation conditions. Format 2 contains a repeated main preamble and a CP of approximately 200 $\mu$s. With a random access opportunity length of 2 milliseconds (ms) the remaining guard period is also approximately 200 $\mu$s. This format supports cell radii of up to approximately 30 km. Format 3 also contains a repeated main preamble and an extended CP. Using a random access opportunity length of 3 ms this format supports cell radii of up to approximately 100 km. As opposed to format 1, format 3 contains a repeated preamble and is therefore better suited for environments with bad propagation conditions.

The requirements on the sequence comprising the preamble are two-fold: good Auto-Correlation Function (ACF) properties and good Cross-Correlation Function (CCF) properties. A sequence that has ideal (periodic) ACF and CCF properties is the Zadoff-Chu sequence. The periodic ACF of the Zadoff-Chu sequence is only non-zero at time lag zero (and periodic extensions) and the magnitude of the CCF is equal to the square root of the sequence length N. Due to special properties of Zadoff-Chu sequences the number of sequences is maximized if N is chosen prime. This together with the requirement that the effective random access bandwidth N·1250 Hz should fit into 1.05 Megahertz (MHz) leads to N=839.

A Zadoff-Chu sequence of length N can be expressed, in the frequency domain, as:

$$X_{ZC}^{(u)}(k) = e^{-j\pi u \frac{k \cdot (k+1)}{N}}$$

where u is the index of the Zadoff-Chu sequence within the set of Zadoff-Chu sequences of length N. Out of one Zadoff-Chu sequence—in the following also denoted root sequence—multiple preamble sequences can be derived by cyclic shifting. Due to the ideal ACF of the Zadoff-Chu sequence multiple mutually orthogonal sequences can be derived from a single root sequence by cyclic shifting one root sequence multiple times the maximum allowed round trip time plus delay spread in the time domain. The correlation of such a cyclic shifted sequence and the underlying root sequence has its peak no longer at zero but at the cyclic shift. If the received signal now has a valid round trip delay—i.e., not larger than the maximum assumed round trip time—the correlation peak occurs at the cyclic shift plus the round trip delay which is still in the correct correlation zone (see FIG. 6). For small cells with up to 1.5 km radii, all 64 preambles can be derived from a single root sequence and are therefore orthogonal to each other. In larger cells not all preambles can be derived from a single root sequence and multiple root sequences must be allocated to a cell. Preambles derived from different root sequences are not orthogonal to each other.

One disadvantage of Zadoff-Chu sequences is their behavior at high frequency offsets. A frequency offset creates an additional correlation peak in the time domain. A frequency offset has to be considered high if it becomes substantial relative to the random access sub-carrier spacing of 1250 Hz, e.g. from 400 Hz upwards. The offset of the second correlation peak relative to the main peak depends on the root sequence. An offset smaller than Target Cell Selection (TCS) may lead to wrong timing estimates, whereas values larger than TCS increase the false alarm rate. In order to cope with this problem LTE has a high speed mode (or better high frequency offset mode) which disables certain cyclic shift values and root sequences so that transmitted preamble and round trip time can uniquely be identified. Additionally, a special receiver combining both correlation peaks is required. For cells larger than approximately 35 km no set of 64 preambles exists that allows unique identification of transmitted preamble and estimation of propagation delay, i.e. cells larger than 35 km cannot be supported in high speed mode.

The random access preamble sequences are ordered according to a specified table. The table was designed by first separating all PRACH sequences into two groups based on the Quadrature Phase Shift Keying (QPSK) Cubic Metric (CM) value using a fixed 1.2 decibel (dB) threshold. The sequences with low CM are more suitable to assign to large cells than the sequences with high CM. Within each CM group (high and low) the sequences are further grouped according to the maximum allowed cyclic shift (Smax) at high speed.

In order to receive various types of DCI as well as to receive the RAR response message during random access, a UE performs PDCCH monitoring. In particular, a UE monitors a common search space and a UE specific search space in the PDCCH. In each search space, a limited number of candidates or equivalently PDCCH transmission hypothesis is checked, in every downlink subframe. These are known as blind decodes, and the UE checks whether any of the transmitted DCI messages is intended for it. PDCCH employs an interleaving technique where a coded DCI is spread out over resource elements covering a large frequency range.

The UE monitors the following Radio Network Temporary Identifiers (RNTIs) that are associated with the random access and paging procedures for each associated search spaces on PDCCH:
  The RA-RNTI for MSG2 is monitored in the common search space.
  The TC-RNTI for MSG3 is monitored in the common search space, for reallocating the MSG3 in frequency.
  The TC-RNTI for MSG4 is monitored in the common search and UE specific TC-RNTI search space.
  The C-RNTI for MSG4 is monitored in the common search and UE specific C-RNTI search space.
  The Paging Radio Network Temporary Identifier (P-RNTI) is monitored is monitored in the common search space.

Work in 3GPP is ongoing on reducing device complexity in order to address a potential Machine Type Communication (MTC) market requiring low device cost. One identified method for reducing cost is to reduce the UE received bandwidth. In other words, the received bandwidth of a MTC UE would be less than the system bandwidth of the downlink from the LTE RAN. The bandwidth of the MTC UE can be reduced by limiting the number of schedulable resource blocks for the physical data channels (e.g., PDSCH) while still receiving physical control channels (e.g., PDCCH) over the entire bandwidth or by reducing the bandwidth of all receptions.

If the bandwidths of some UEs are reduced, then the message transmissions, UE specific or common, that may address these UEs need to respect these bandwidth limitations. This means that a common transmission such as the RACH MSG2 transmission (for which a single transmission may contain random access responses to several different UEs) needs to be bandwidth limited, which may significantly reduce the feasible size of MSG2 and hence the number of PRACH preambles that can be acknowledged simultaneously in MSG2. This will reduce the RACH capacity significantly. In addition, for scenarios where UEs do not receive the entire system bandwidth even for physical control channels (e.g., PDCCH), these UEs will not be able to receive scheduling information for MSG2 and, therefore, will not know where to look for the MSG2.

As such, there is a need for systems and methods for random access for UEs, such as MTC UEs, having a reduced received bandwidth.

SUMMARY

Systems and methods relating to transmission and reception of a Random Access Response (RAR) message to a wireless device (e.g., a User Equipment (UE)) in a manner that is particularly well suited for, but not limited to, reduced bandwidth devices, such as Machine Type Communication (MTC) devices, are disclosed. In some embodiments, a method of operation of a wireless device to perform random access to a cellular communications network comprises transmitting a random access preamble on a physical random access channel and determining, from a random access preamble index of the random access preamble, one of a random access response resource and a channel to monitor for a transmission of an indication of the random access response resource. The method further comprises receiving a random access response on the random access response resource.

In some embodiments, determining one of the random access response resource and the channel to monitor for the transmission of the indication of the random access response resource comprises determining the random access response resource from the random access preamble index. Determining the random access response resource from the random access preamble index is, for example, particularly beneficial in embodiments where the wireless device is a reduced bandwidth wireless device that does not receive a control channel that is used to transmit indications of random access response resources for random access procedures performed by other non-bandwidth-reduced wireless devices.

In some embodiments, determining the random access response resource from the random access preamble comprises determining the random access response resource from the random access preamble index according to a predefined mapping of random access preamble indices and random access response resources. In some embodiments, the predefined mapping is a function of cell index. In some embodiments, the predefined mapping is such that two or more of the random access preamble indices are mapping to the random access response resource. In some embodiments, the predefined mapping is such that a random access preamble index maps to different random access response resources in different subframes.

In some embodiments, determining, from the random access preamble index, one of the random access response resource and the channel to monitor for the transmission of the indication of the random access response resource comprises determining the channel to monitor for the transmission of the indication of the random access response resource from the random access preamble index. Further, in some embodiments, determining the channel to monitor for the indication of the random access response resource comprises determining the channel to monitor for the indication of the random access response resource according to a predefined mapping. In some embodiments, the predefined mapping is a predefined mapping between random access preamble indices and radio network temporary identifiers.

In some embodiments, the cellular communications network is a Long Term Evolution (LTE) network, and the random access response resource is a set of physical resource blocks. In some embodiments, the method further comprises receiving a random access response configuration from the cellular communications network, where the random access response configuration indicates a number of physical resource blocks in the set of physical resource blocks.

In some embodiments, the random access response resource determined from the random access preamble index is valid for a single subframe determined from the preamble index, and receiving the random access response on the random access response resource comprises receiving the random access response on the random access response resource in a single subframe.

In some embodiments, the random access response resource determined from the random access preamble index is valid for multiple subframes determined from the preamble index, and receiving the random access response on the random access response resource comprises receiving the random access response on the random access response resource over multiple subframes. In some embodiments, the RAR is repeated over the multiple subframes.

In some embodiments, determining, from the random access preamble index, one of the random access response resource and the channel to monitor for the transmission of the indication of the random access response resource comprises determining, from the random access preamble index and a cell index of a cell for which the wireless device is performing random access, the one of the random access response resource and the channel to monitor for the transmission of the indication of the random access response resource.

In some embodiments, the random access response is divided into multiple parts comprising a common part that is common for multiple random access responses to multiple wireless devices, and receiving the random access response on the random access response resource comprises receiving the common part of the random access response on the random access response resource.

In some embodiments, the wireless device is a reduced bandwidth device that receives only a portion of a system bandwidth of a downlink of the cellular communications network. Further, in some embodiments, the cellular communications network is a LTE network, and the wireless device does not receive a downlink control channel that spans the system bandwidth.

Embodiments of a wireless device that operates according to any of the embodiments described above are also disclosed.

Embodiments of a method of operation of a base station to perform random access to a cellular communications network are also disclosed. In some embodiments, the method of operation of the base station comprises detecting a random access preamble on a physical random access channel and determining, from a random access preamble index of the random access preamble, one of a random access response resource and a channel on which to transmit an indication of the random access response resource. The method further includes transmitting a random access response on the random access response resource.

In some embodiments, determining, from the random access preamble index, one of the random access response resource and the channel on which to transmit the indication of the random access response resource comprises determining the random access response resource from the random access preamble index. In some embodiments, determining the random access response resource from the random access preamble comprises determining the random access response resource from the random access preamble according to a predefined mapping of random access preamble indices and random access response resources. In some embodiments, the predefined mapping is a function of cell index. In some embodiments, the predefined mapping is such that two or more of the random access preamble indices are mapping to the random access response resource. In some embodiments, the predefined mapping is such that a random access preamble index maps to different random access response resources in different subframes.

In some embodiments, determining, from the random access preamble index, one of the random access response resource and the channel on which to transmit the indication of the random access response resource comprises determining the channel on which to transmit the indication of the random access response resource from the random access preamble index and transmitting the indication of the random access response resource on the channel. In some embodiments, determining the channel comprises determining the channel on which to transmit the indication of the random access response resource according to a predefined mapping. In some embodiments, the predefined mapping is a predefined mapping between random access preamble indices and radio network temporary identifiers.

In some embodiments, the cellular communications network is a LTE network, and the random access response resource is a set of physical resource blocks. In some embodiments, the method further comprises transmitting a random access response configuration, the random access response configuration indicating a number of physical resource blocks in the set of physical resource blocks.

Embodiments of a base station that operates according to any of the embodiments described above are also disclosed.

Those skilled in the art will appreciate the scope of the present disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

Figure 1:
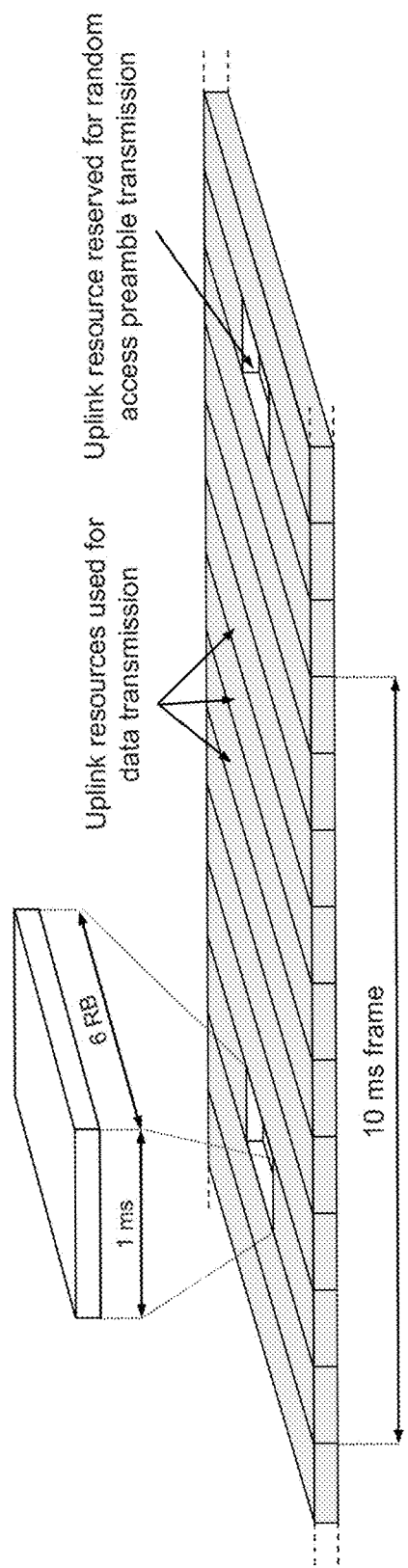
FIG. 1 is a schematic diagram illustrating a random access preamble transmission.
Figure 2:
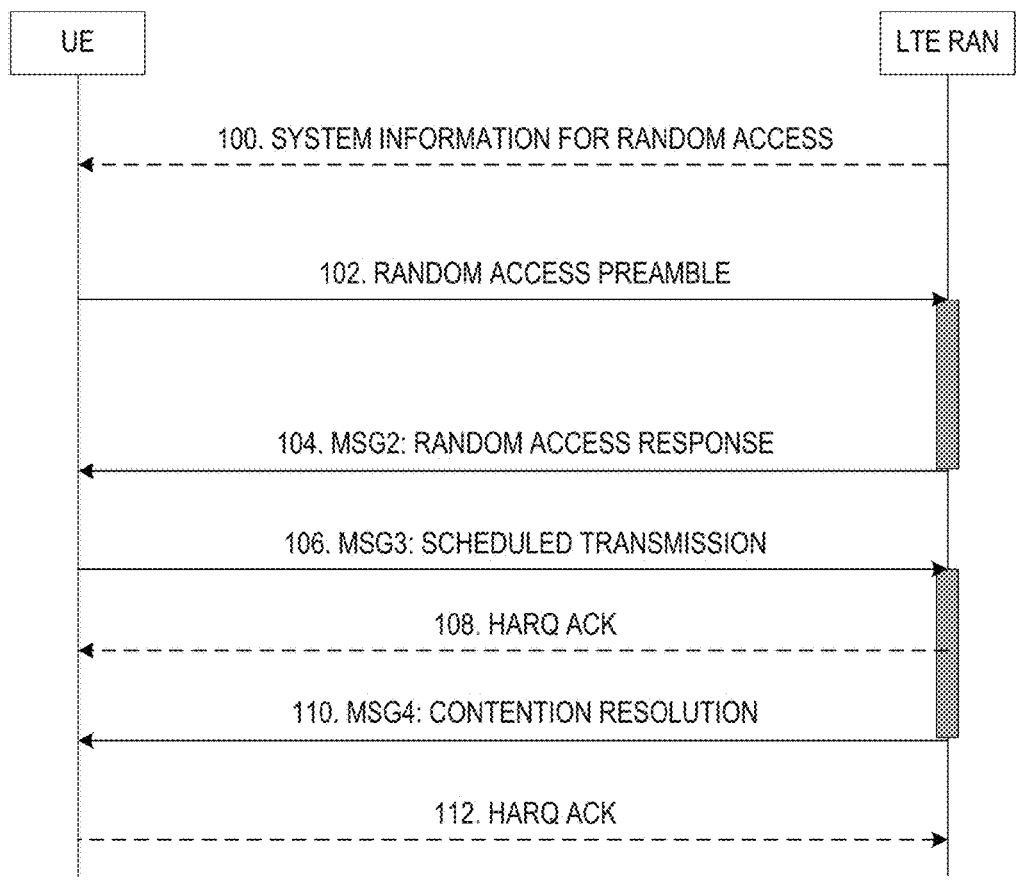
FIG. 2 is a diagram showing signaling over the air interface for a Long Term Evolution (LTE) contention-based random access procedure.
Figure 3:
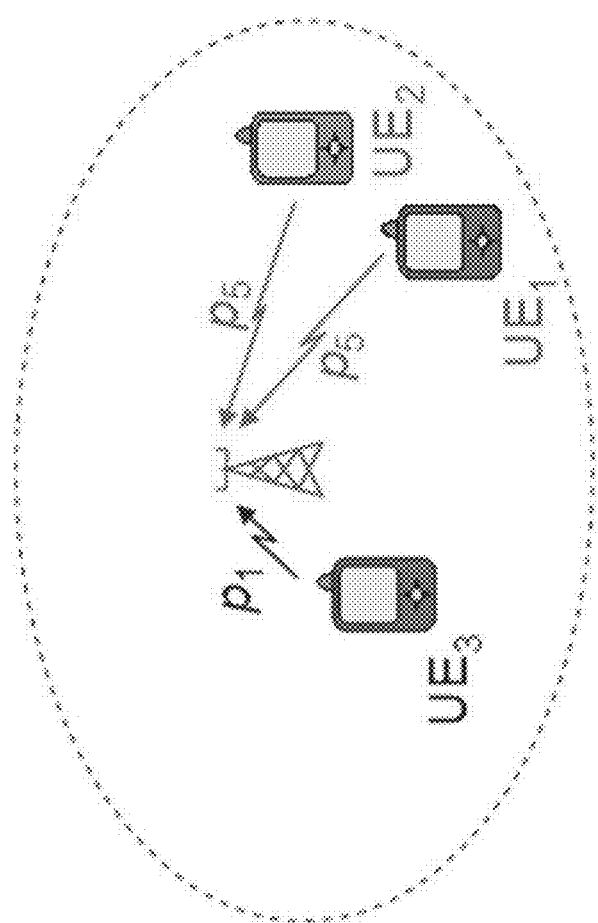
FIG. 3 is a schematic diagram of contention-based random access, where there is contention between two User Equipments (UEs)
Figure 4:
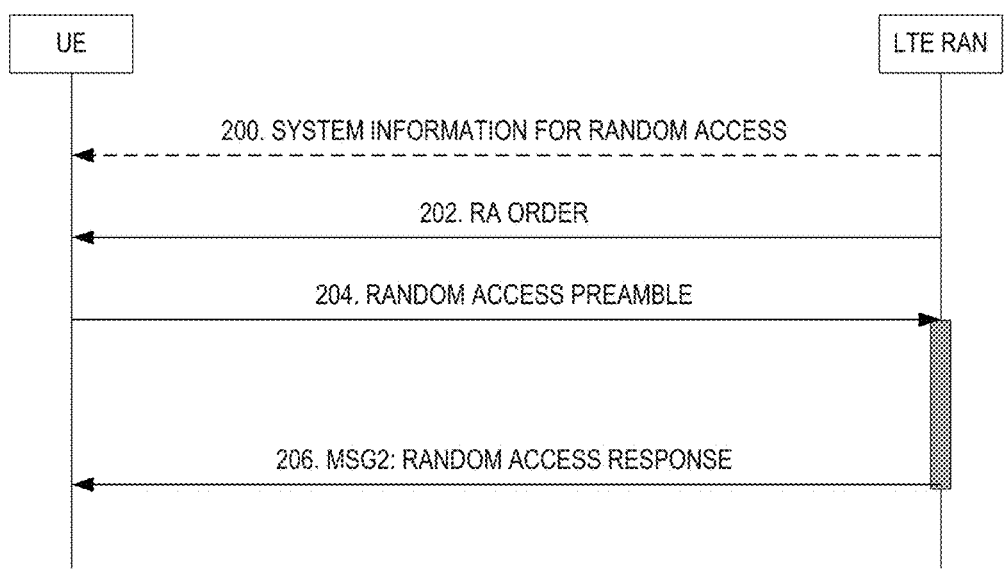
FIG. 4 is a diagram of signaling over the air interface for an LTE contention-free random access procedure.
Figure 5:
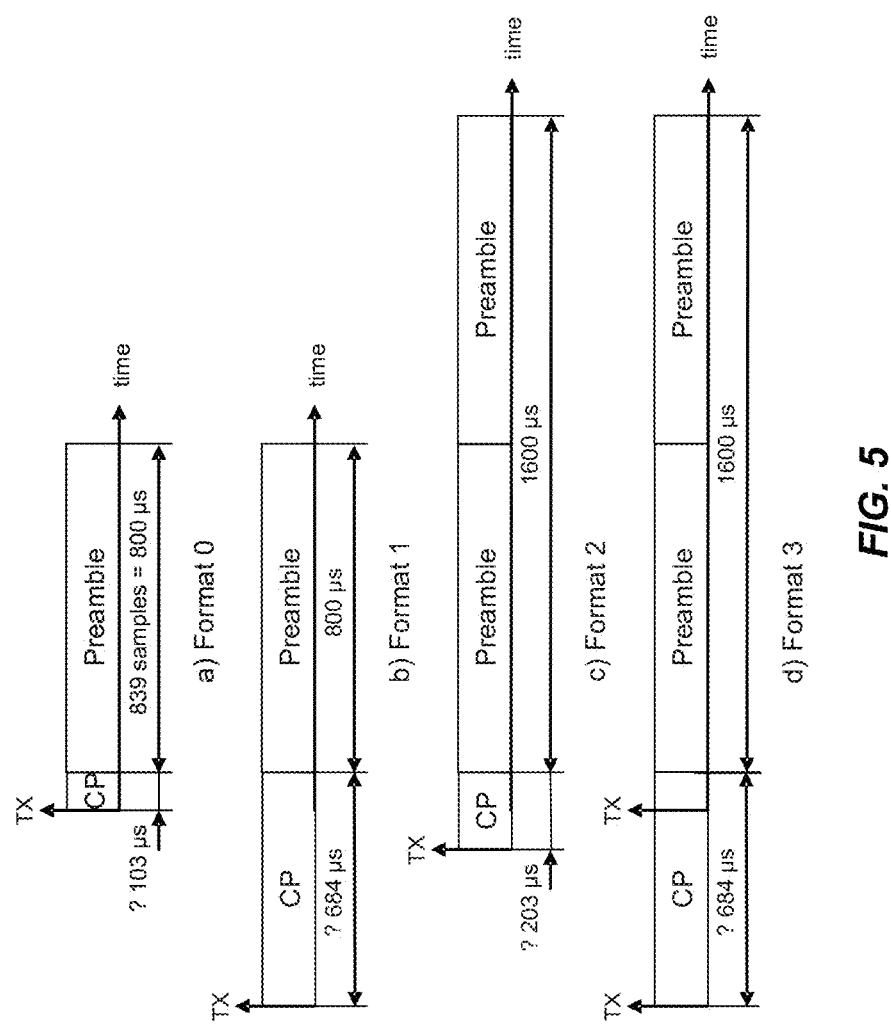
FIG. 5 is a diagram of random access preambles.
Figure 6:
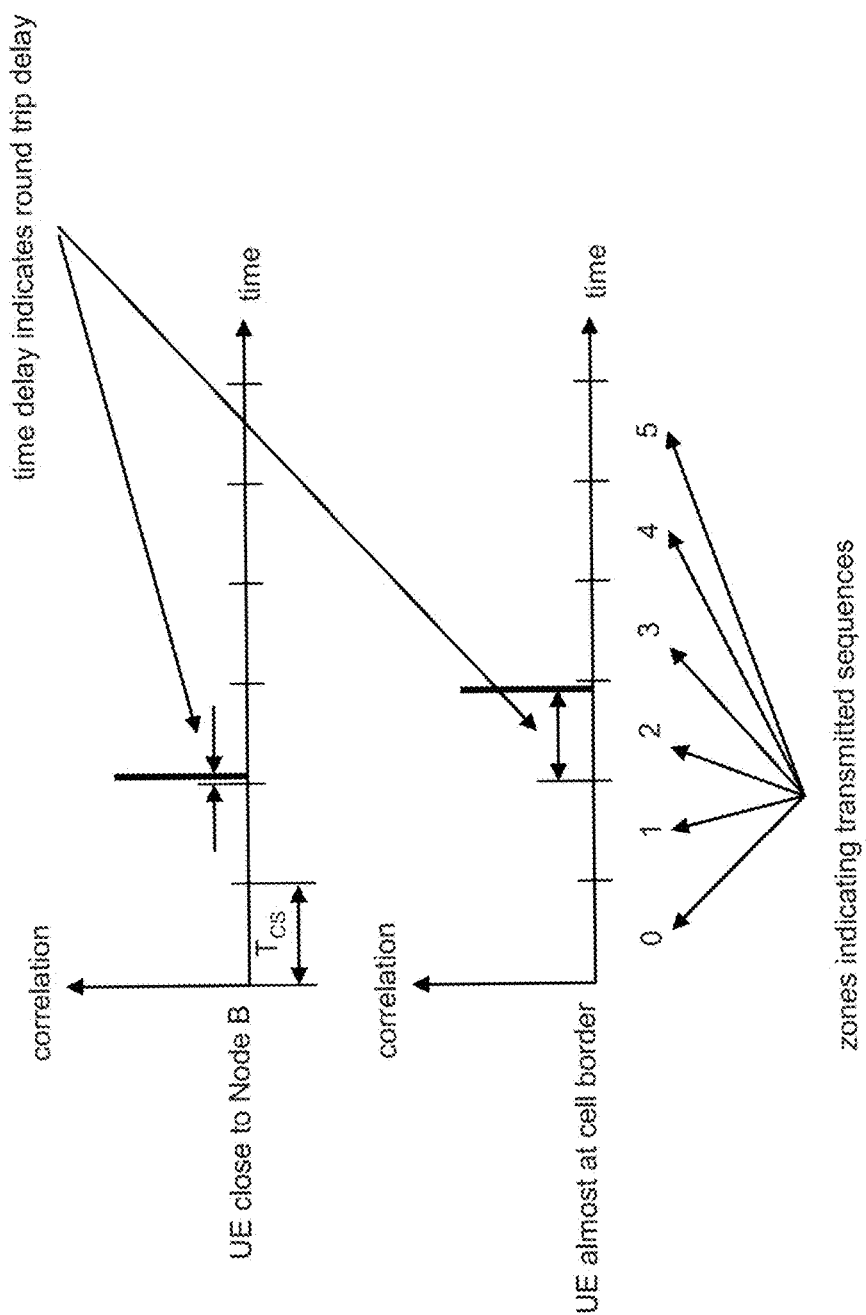
FIG. 6 is a diagram illustrating a comparison of transmitted cyclic shifts.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

The following discussion describes a number of non-limiting and combinable embodiments of the present disclosure.

It should be noted that the embodiments described herein focus on 3$^{rd}$ Generation Partnership Project (3GPP) Long Term Evolution (LTE) (LTE or LTE-Advanced). As such, LTE terminology is sometimes used. However, the present disclosure is not limited to LTE. Rather, the embodiments described herein can be used in any suitable type of cellular communications network, or more generally any type of wireless communications system, in which random access is performed by transmitting a random access sequence, or preamble.

Systems and methods relating to transmission and reception of a Random Access Response (RAR) message to a User Equipment (UE) in a manner that is particularly well-suited for reduced bandwidth devices, such as Machine Type Communication (MTC) devices, are disclosed. As used herein, a UE is a non-limiting term used to refer to any type of wireless device that transmits signals to and/or receives signals from a cellular communications network. A reduced bandwidth UE is a UE that operates to receive only a reduced portion of a system bandwidth of the cellular communications network (or more generally any wireless communications network). However, the reduced bandwidth UE may, in some embodiments, be able to change a center frequency of its received bandwidth. Thus, as an example, the system bandwidth for the downlink for the cellular communications network may be 20 Megahertz (MHz), and the reduced bandwidth UE may receive a bandwidth of 1.4 MHz. Further, as an example, the reduced bandwidth UE may be able to change the center frequency of the reduced bandwidth such that, at one time, the reduced bandwidth UE receives one 1.4 MHz portion of the downlink bandwidth and, at another time, the reduced bandwidth receives another 1.4 MHz portion of the downlink bandwidth. One example of a reduced bandwidth UE is a MTC device having a reduced reception bandwidth as compared to the downlink system bandwidth of the cellular communications network.

With regard to reduced bandwidth UEs, in order to allow the RAR message to each UE to be transmitted with sufficient bandwidth, the network is allowed to transmit more than one RAR message (i.e., Random Access Channel (RACH) MSG2) simultaneously. If bandwidth is reduced so that the UE cannot read the Physical Downlink Control Channel (PDCCH), then some means for informing the UE about where and how to find its random access response is needed.

In some embodiments of the present disclosure, a mapping is provided which maps each random access preamble index to a set of Physical Resource Blocks (PRBs) where UEs will find the RAR in response to transmitting a random access preamble having that random access preamble index. The number of PRBs in the set of PRBs for each random access preamble index may be fixed in a standard (e.g., a 3GPP LTE standard) or signaled in a system broadcast (e.g., in a new information element, e.g. in System Information Block 2 (SIB2) or in a new SIB). The RAR resource may be valid for a subframe or for multiple subframes where the UE blindly decodes each valid subframe or in some embodiments the RAR is encoded to multiple of the subframes to provide diversity. In other words, in some embodiments, the RAR may be repeated over multiple subframes to, e.g., provide diversity. Notably, these multiple subframes are to be distinguished from a RAR window. In some embodiments, a RAR window may be defined. The RAR window defines a window of time (e.g., a number of subframes) in which the RAR may occur. The multiple valid subframes are then multiple subframes during the RAR window in which the RAR occurs. The RAR PRBs may depend on the subframe index or on how many subframes have already been monitored.

As an example, a mapping function from the random access preamble index to the PRBs to decode when searching for a RAR may be:

$$I_{PRB\_i} = I_{PRACH} * N_{PRB\_RAR} \mod(N_{PRB\_PDSCH} - N_{PRB\_RAR}) + i; i = [0, N_{PRB\_RAR-1}]$$

where $I_{PRB\_i}$ is an index of the i-th PRB of the RAR, $I_{PRACH}$ is an index of the used random access preamble (also referred to herein as a Physical Random Access Channel (PRACH) preamble) and is typically a random value in the range of and including 0 to 63, $N_{PRB\_RAR}$ is the number of PRBs in a RAR transmission (e.g., 6), and $N_{PRB\_PDSCH}$ is a total number of downlink PRBs in the cell on which random access is being performed depending on the system bandwidth of the downlink (e.g., 6 to 100 PRBs in LTE). Using this mapping, the random access preambles are cyclically mapped to the downlink bandwidth. Preambles will only be mapped to individual resources if the entire downlink bandwidth, $N_{PRB\_PDSCH}$, is sufficiently large, else the resource mapping will be wrapped such that two (or more) indexes may map to the same resource. The mapping function given above is only an example and it is understood in the scope of the present disclosure that other mapping functions can be used. Examples of such mappings can be realized as offsets to the described mapping and/or by hashing of the preamble index, where the hashing may be dependent on the subframe the resource is valid and/or the cell index and/or the preamble index. In some embodiments, hashing is done in such a way that random access preamble indexes mapping to the same resource in one subframe map to different resources in other subframes.

In some embodiments, the transport block size used for the RAR transmission is fixed and known to the UE, either by fixing it in a standard (e.g., a 3GPP LTE standard) or by announcing the value by system broadcast. In some embodiments, the transport block size can be different. In this case, the UE can blindly decode with different assumptions to see for which assumption the Cyclic Redundancy Check (CRC) protecting the data checks.

In some embodiments, the signaling in random access response may be split into multiple parts where a resource common for multiple preambles is provided in one subframe. This resource may, for example, be used to transmit a back-off indicator if needed and may also be used to indicate preambles for which a RAR will be provided in a different subframe.

In some embodiments, the resource used for RAR is configured by higher layers as a UE-specific resource. These embodiments may be applicable, for example, for contention free random access, for example done at handover. In this example, the resource to use for RAR can be configured together with the preamble to use for a contention free random access.

In some embodiments, the mapping function from a preamble index is instead mapping to a channel used to provide a resource for the random access response. In some embodiments such a mapping may be to a Radio Network Temporary Identifier (RNTI) to use when monitoring PDCCH. In some embodiments, the search space on PDCCH is also determined by the preamble index, or the RNTI. In some embodiments, both the current Random Access RNTI (RA-RNTI) as well as one or multiple additional RNTIs are monitored by the UE. The additional RNTI is in some embodiments derived from the preamble index.

In some embodiments the grant channel may be a new control channel for granting random access response. In some embodiments the new channel is based on an Enhanced Physical Downlink Control Channel (EPDCCH).

Figure 7:
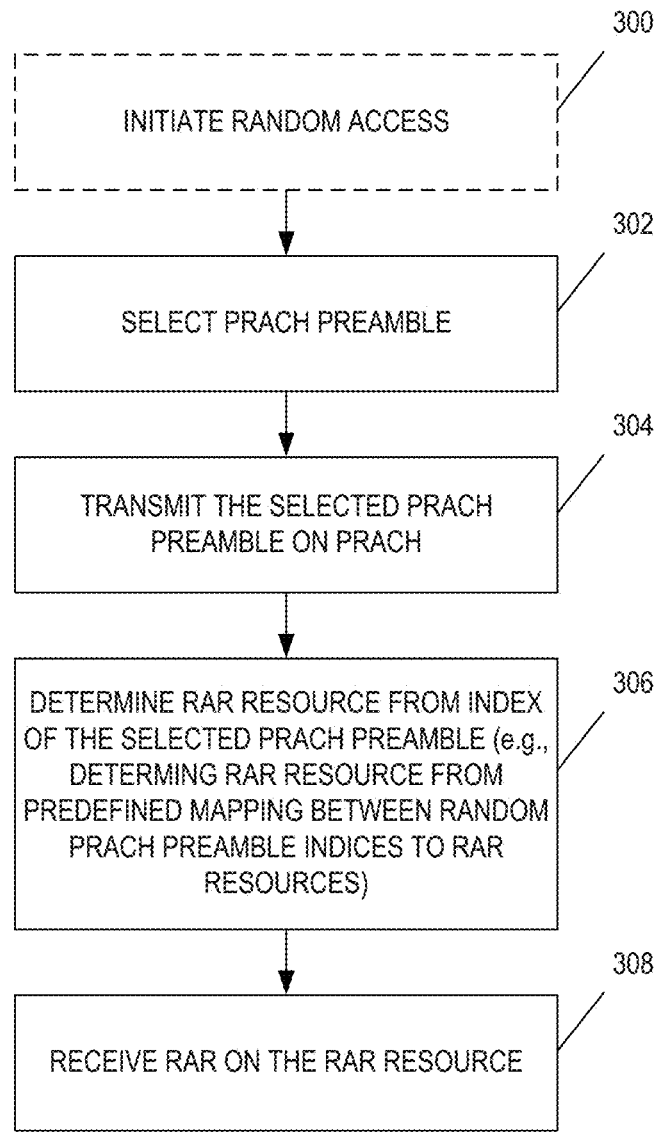
FIG. 7 is a process flow diagram for a UE performing one example of a random access procedure in accordance with embodiments of the present disclosure.

FIG. 7 is a process flow diagram for a UE performing one example of a random access procedure in accordance with embodiments of the present disclosure. As illustrated, in some embodiments or scenarios, the UE initiates random access (step 300). For example, the UE may initiate random access for initial access when the UE is in Radio Resource Control (RRC) IDLE state. Notably, in some embodiments, random access may be initiated by the cellular communications network. Upon initiating random access, the UE selects a PRACH preamble (step 302). For example, currently in LTE, there are 64 PRACH preambles available for a given cell. These 64 PRACH preambles are divided into a number of groups or subsets. Thus, in order to select the PRACH preamble, the UE selects the appropriate group based on one or more appropriate criteria and then randomly selects a PRACH preamble from the selected group, as will be appreciated by one of ordinary skill in the art. Notably, the given example of PRACH preamble selection is for LTE. Other PRACH selection schemes may be used for other types of networks.

The UE transmits the selected PRACH preamble on a PRACH (step 304). In some embodiments, the PRACH preamble is transmitted on the PRACH in the conventional manner. In particular, the time and frequency resources for available for PRACH transmission are broadcast in the system information. The UE then transmits the selected PRACH preamble on a PRACH using time and frequency resources available for PRACH transmission. These time and frequency resources correspond to a RA-RNTI.

The UE calculates or otherwise determines a RAR resource from an index of the selected PRACH preamble (step 306). The RAR resource is the resource on which the UE is to monitor for a RAR transmitted by the network in response to its transmission of the PRACH preamble in step 304. In some embodiments, the RAR resource is a set of PRBs. For instance, if the system bandwidth is 100 PRBs (as in the case of a 20 MHz LTE downlink bandwidth) but the number of PRBs for the RAR transmission (the bandwidth of the RAR transmission) is 6 PRBs, then the RAR resource is a set of 6 PRBs somewhere in the downlink system bandwidth. In some embodiments where the UE is a reduced bandwidth UE, the number of PRBs for the RAR transmission is equal to or less than the reduced bandwidth of the UE. The bandwidth of the RAR transmission may be defined by standard or signaled by the network (e.g., as system information). Further, the RAR resource may be valid for a single subframe or multiple subframes. In other words, the subframe(s) in which the RAR resource is valid for a RAR is, in some embodiments, a function of the index of the selected PRACH preamble.

As discussed above, in some embodiments, the RAR resource is determined from the PRACH preamble index using a predefined mapping that maps the index of the selected PRACH preamble into the RAR resource or, more specifically, an index for the RAR resource. This mapping may, for example, be defined by standard or signaled by the network (e.g., in system information). As also discussed above, the mapping may be a function the PRACH preamble index or a function of the PRACH preamble index and one or more other parameters (e.g., subframe(s) for which the RAR resource is valid and/or cell index of the cell for which random access is being performed).

The UE receives the RAR on the RAR resource determined in step 306 (step 308). More specifically, the RAR resource indicates to the UE where the UE should search for a RAR in response to the transmission of the PRACH preamble in step 304. For instance, the RAR resource may be a set of PRBs that is valid or one or more subframes. The UE may then search the set of PRBs during the one or more subframes for which the RAR resource is valid for a RAR. In other words, the UE blindly decodes the one or more subframes on the RAR resource to search for a RAR from the network.

As discussed above, in some embodiments, the transport block size used for the RAR transmission is fixed and known to the UE. In other embodiments, the transport block size is not known to the UE, and the UE blindly decodes the signal received on the RAR resource with different assumptions to determine whether any of these assumptions results in a successful reception of a RAR (i.e., results successful CRC).

Further, in some embodiments, the RAR may be split into multiple parts. One of these parts is a resource common for random access responses to transmissions of multiple PRACH preambles by multiple UEs. This common resource, or common part, is, in some embodiments, transmitted in the RAR resource. Upon detecting a RAR on the RAR resource, the UE proceeds with random access, e.g. in the conventional manner.

Figure 8:
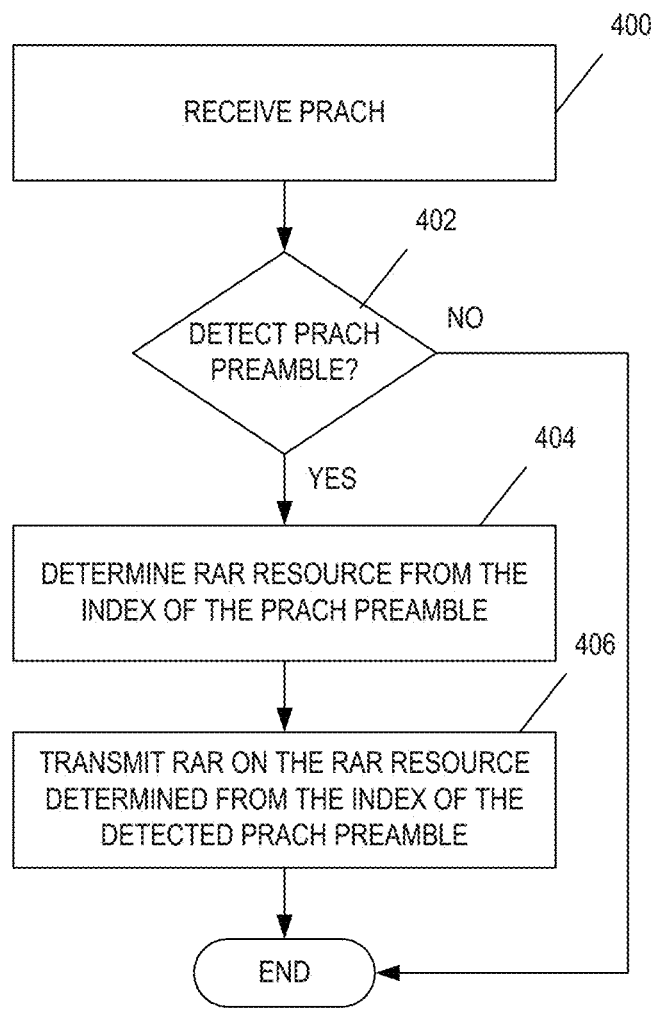
FIG. 8 is a process flow diagram for a base station performing one example of a random access procedure in accordance with embodiments of the present disclosure.

FIG. 8 is a process flow diagram for a base station (e.g., an enhanced or evolved Node B (eNB)) performing one example of a random access procedure in accordance with embodiments of the present disclosure. This process is the network side of the random access procedure described above with respect to FIG. 7. As illustrated, the base station receives a PRACH (step 400) and determines whether a PRACH preamble is detected on the PRACH (step 402).

Steps 400 and 402 are, in some embodiments, performed in the conventional manner for LTE eNBs. If a PRACH preamble is not detected, the process ends.

If a PRACH preamble is detected, the base station determines a RAR resource from the index of the PRACH preamble detected on the PRACH (step 404). The RAR resource may be determined as described above. The base station then transmits a RAR to the UE that transmitted the PRACH preamble in the RAR resource (step 406). For example, if the RAR resource is a set of PRBs in one or more valid subframes, the base station transmits the RAR on the set of PRBs in the valid subframe(s). In this manner, the base station transmits, and the UE receives, the RAR without the need of scheduling information in a corresponding control channel (e.g., PDCCH). This is particularly beneficial for reduced bandwidth UEs that do not receive PDCCH due to their reduced bandwidth.

Figure 9:
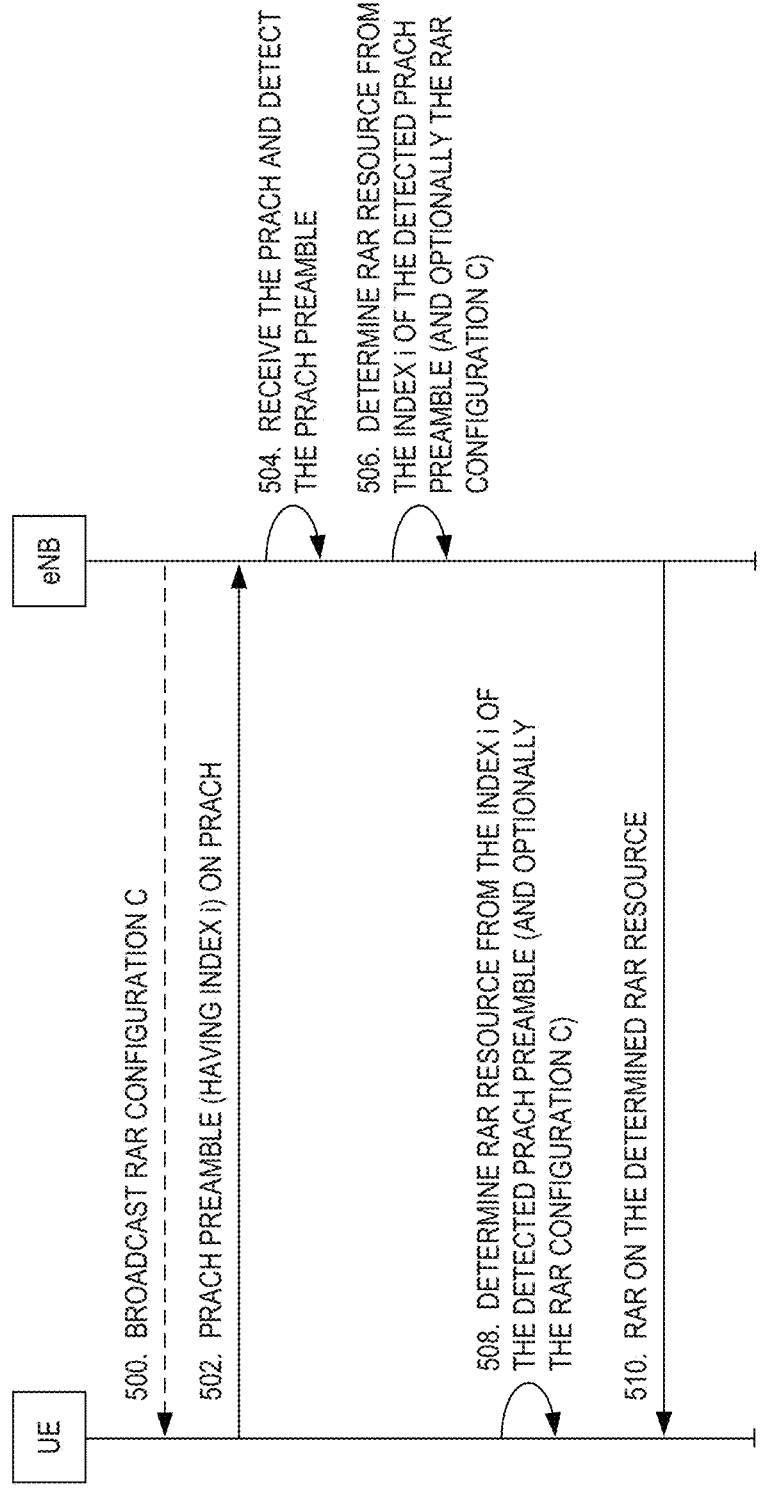
FIG. 9 is a diagram illustrating the operation of a UE and a base station to perform one example of a random access procedure in accordance with embodiments of the present disclosure.

FIG. 9 is a diagram illustrating the operation of a UE and a base station to perform one example of a random access procedure in accordance with embodiments of the present disclosure. In particular, FIG. 9 illustrates the operation of the UE and the base station, in general, according to the processes of FIGS. 7 and 8. As illustrated, in some embodiments, the base station, or eNB, broadcasts (or otherwise provides) a RAR configuration (C) to the UE (step 500). The RAR configuration (C) may include, for example, a bandwidth of a RAR (e.g., the number of PRBs for a RAR message), mappings of PRACH preambles to RAR resources, or any other information useful to the UE when operating according to the embodiments described herein.

As discussed above, the UE selects and transmits a PRACH preamble (also referred to as a PRACH sequence) on a PRACH (step 502). The eNB receives the PRACH and detects the transmitted PRACH preamble (step 504). The eNB determines a RAR resource from an index of the detected PRACH preamble and, in some embodiments, the RAR configuration (C), as discussed above (step 506). Likewise, the UE determines the RAR resource from the index of the transmitted PRACH preamble and, in some embodiments, the RAR configuration (C) (step 508). The eNB transmits, and the UE receives, a RAR on the RAR resource (step 510).

Figure 10:
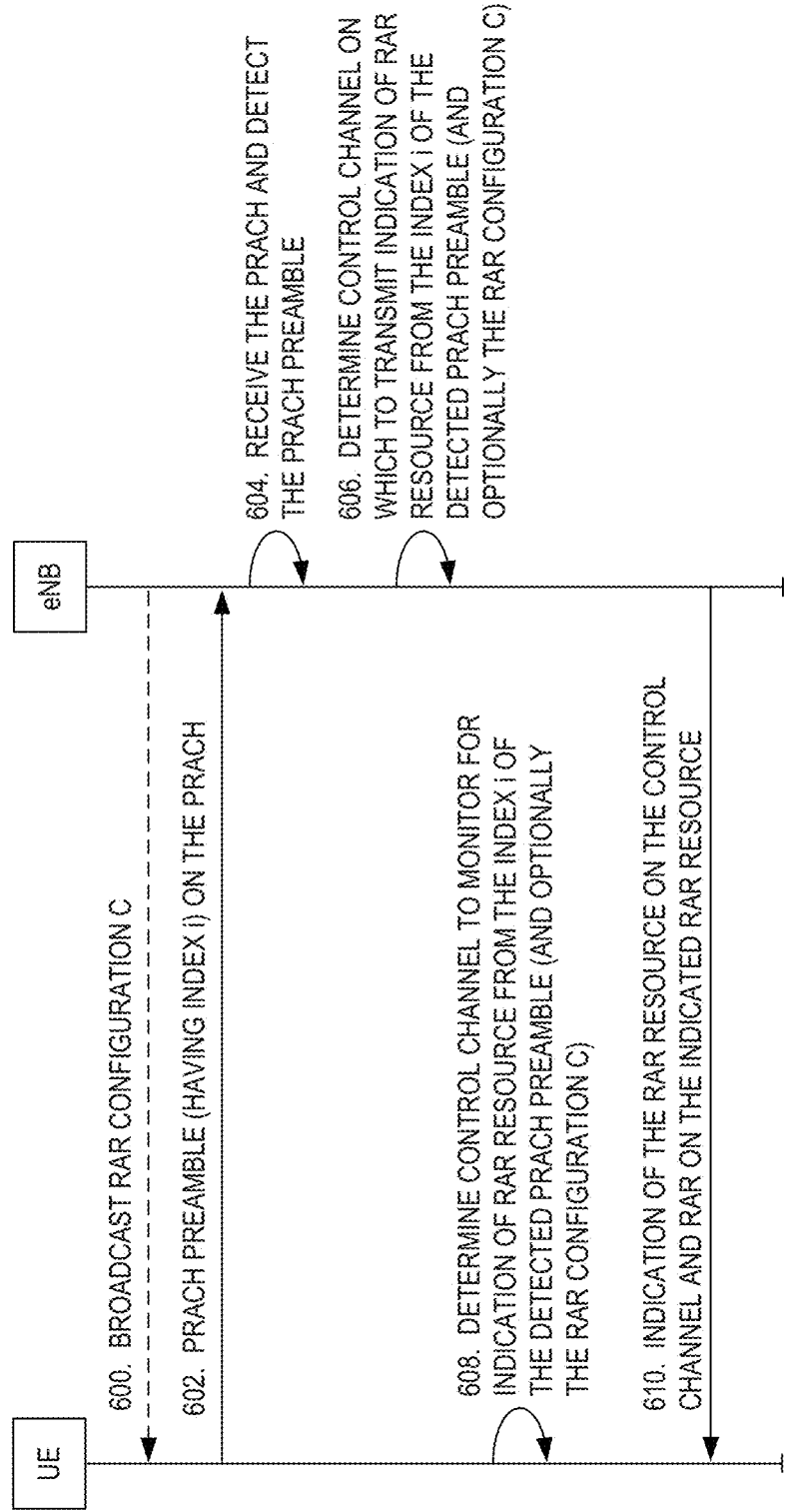
FIG. 10 is a diagram illustrating the operation of a UE and a base station to perform one example of a random access procedure in accordance with some alternative embodiments of the present disclosure.

As discussed above, in some alternative embodiments, rather than mapping the PRACH preamble index to the RAR resource, the PRACH preamble index is mapped to a control channel used to transmit an indication of the RAR resource. As illustrated in FIG. 10, in some embodiments, the base station, or eNB, broadcasts (or otherwise provides) a RAR configuration (C) to the UE (step 600). The RAR configuration (C) may include, for example, a bandwidth of a RAR (e.g., the number of PRBs for a RAR message), mappings of PRACH preambles to control channels, or any other information useful to the UE when operating according to the embodiments described herein.

As discussed above, the UE selects and transmits a PRACH preamble (also referred to as a PRACH sequence) on a PRACH (step 602). The eNB receives the PRACH and detects the transmitted PRACH preamble (step 604). The eNB determines a channel from an index of the detected PRACH preamble and, in some embodiments, the RAR configuration (C), as discussed above (step 606). For instance, in some embodiments, PRACH preamble indices are mapped to RNTIs to be used when monitoring a control channel (e.g., PDCCH, EPDCCH, or some other type of control channel). In some embodiments, a search space for the control channel may also be determined from the PRACH preamble index. Still further, multiple different RNTIs (e.g., RA-RNTI and one or more other types of RNTIs) may be determined from the PRACH preamble index. Likewise, the UE determines the channel from the index of the transmitted PRACH preamble and, in some embodiments, the RAR configuration (C) (step 608).

The eNB transmits an indication of a RAR resource used for transmission of a RAR on the determined control channel and transmits the RAR on the RAR resource indicated on the determined control channel (step 610). For instance, in some embodiments, the PRACH preamble index is mapped to a RNTI. The UE then uses this RNTI to monitor the control channel for the transmission of the indication of the RAR resource. Upon detecting the transmission of the indication of the RAR resource, the UE decodes the RAR transmission in the indicated RAR resource.

Figure 11:
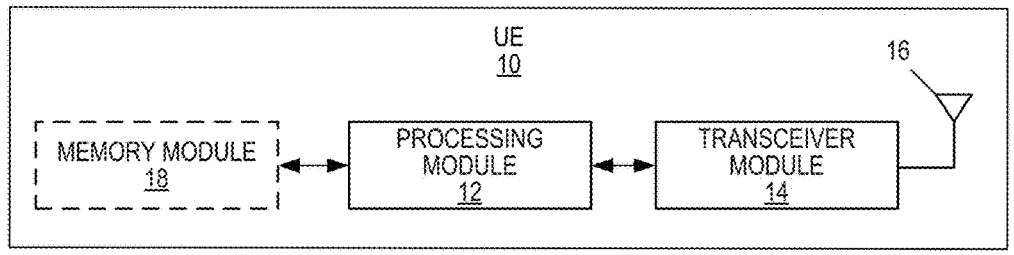
FIG. 11 is a block diagram of a UE according to some embodiments of the present disclosure.

FIG. 11 is a block diagram of a UE 10, according to some exemplary embodiments, that can be used in one or more of the non-limiting example embodiments described herein. The UE 10 may in some embodiments be a mobile device that is configured for Machine-to-Machine (M2M) or MTC. The UE 10 comprises a processing module 12 that controls the operation of the UE 10. As will be appreciated by one of ordinary skill in the art, the processing module 12 includes one or more processors (or processor circuits) such as, for example, one or more Central Processing Units (CPUs), one or more Application Specific Integrated Circuits (ASICs), and/or one or more Field Programmable Gate Arrays (FPGAs). The processing module 12 is connected to a receiver or transceiver module 14 with associated antenna(s) 16 which are used to receive signals from or both transmit signals to and receive signals from a base station in the network. As will be appreciated by one of ordinary skill in the art, the transceiver module 14 includes various hardware components such as, for example, filters, amplifiers, etc. The UE 10 also comprises a memory module 18 that is connected to the processing module 12 and that stores program and other information and data required for the operation of the UE 10. The memory stores instructions that can be executed by the processor(s) of the processing module 12, whereby the UE 10 operates as described herein. In some embodiments, the UE 10 may optionally comprise a satellite positioning system (e.g., Global Positioning System (GPS)) receiver module (not shown) that can be used to determine the position and speed of movement of the UE 10.

In some embodiments, a computer program including instructions which, when executed by at least one processor, causes the at least one processor to carry out the functionality of the UE 10 according to any of the embodiments described herein is provided. In some embodiments, a carrier containing the aforementioned computer program product is provided. The carrier is one of an electronic signal, an optical signal, a radio signal, or a computer readable storage medium (e.g., a non-transitory computer readable medium such as memory).

Figure 12:
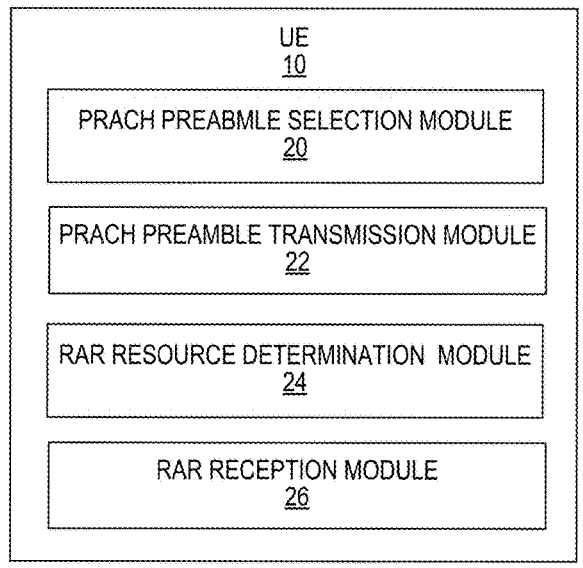
FIG. 12 is a block diagram of a UE according to some other embodiments of the present disclosure.

FIG. 12 illustrates the UE 10 according to some other embodiments of the present disclosure. As illustrated, the UE 10 includes a PRACH preamble selection module 20, a PRACH preamble transmission module 22, a RAR resource determination module 24, and a RAR reception module 26, each of which is implemented in software. The PRACH preamble selection module 20 selects a PRACH preamble for transmission. The PRACH preamble transmission module 22 then transmits the selected PRACH preamble on a PRACH via an associated transmitter of the UE 10 (not shown). The RAR resource determination module 24 determines the RAR resource from the index of the selected PRACH preamble, as described above. The RAR reception module 26 then receives a RAR on the RAR resource via an associated receiver (not shown) of the UE 10. Notably, in some alternative embodiments, rather than determining the RAR resource from the index of the PRACH preamble, the UE 10 determines a control channel on which to receive a transmission of an indication of the RAR resource, as described above.

Figure 13:
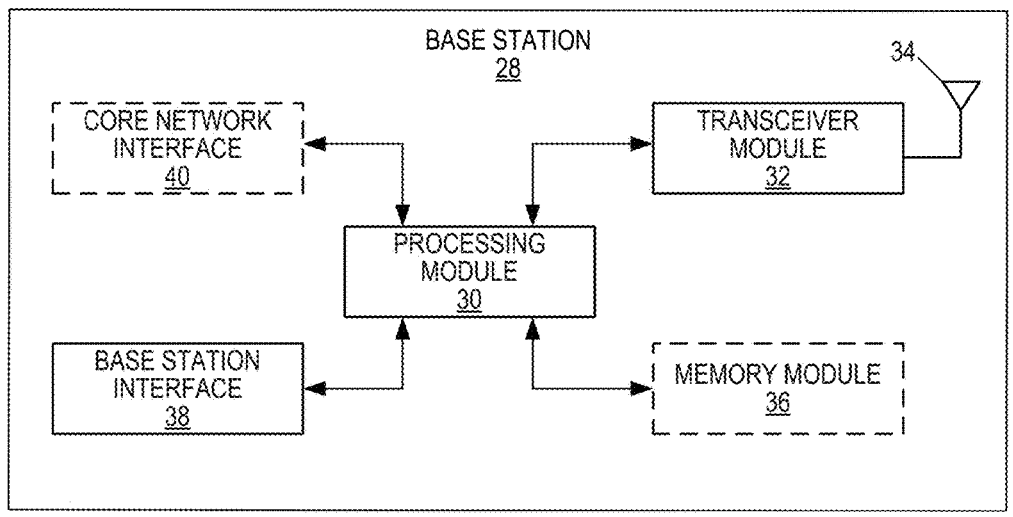
FIG. 13 is a block diagram of a base station according to some embodiments of the present disclosure.

FIG. 13 shows a base station 28 (for example a Node B or an eNB) that can be used in example embodiments described herein. It will be appreciated that although a macro eNB will not in practice be identical in size and structure to a micro eNB, for the purposes of illustration, these different types of base stations 28 are assumed to include similar components. Thus, the base station 28 comprises a processing module 30 that controls the operation of the base station 28. As will be appreciated by one of ordinary skill in the art, the processing module 30 includes one or more processors (or processor circuits) such as, for example, one or more CPUs, one or more ASICs, and/or one or more FPGAs. The processing module 30 is connected to a transceiver module 32 with associated antenna(s) 34 which are used to transmit signals to, and receive signals from, UEs 10 in the network. As will be appreciated by one of ordinary skill in the art, the transceiver module 32 includes various hardware components such as, for example, filters, amplifiers, etc. The base station 28 also comprises a memory module 36 that is connected to the processing module 30 and that stores program and other information and data required for the operation of the base station 28. The base station 28 also includes components and/or circuitry 38 (e.g., a base station interface) for allowing the base station 28 to exchange information with other base stations 28 (for example via an X2 interface) and components and/or circuitry 40 (e.g., a core network interface) for allowing the base station 28 to exchange information with nodes in a core network of the cellular communications network (for example via an S1 interface). It will be appreciated that base stations for use in other types of networks (e.g., Universal Terrestrial Radio Access Networks (UTRANs) or Wideband Code Division Multiple Access (WCDMA) Radio Access Networks (RANs)) will include similar components to those shown in FIG. 13 and appropriate interface circuitry 38, 40 for enabling communications with the other network nodes in those types of networks (e.g., other base stations, mobility management nodes, and/or nodes in the core network).

In some embodiments, a computer program including instructions which, when executed by at least one processor, causes the at least one processor to carry out the functionality of the base station 28 according to any of the embodiments described herein is provided. In some embodiments, a carrier containing the aforementioned computer program product is provided. The carrier is one of an electronic signal, an optical signal, a radio signal, or a computer readable storage medium (e.g., a non-transitory computer readable medium such as memory).

Figure 14:
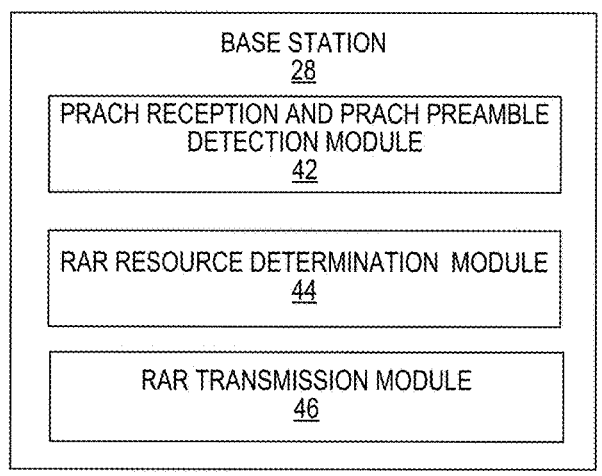
FIG. 14 is a block diagram of a base station according to some other embodiments of the present disclosure.

FIG. 14 illustrates the base station 28 according to some other embodiments of the present disclosure. As illustrated, the base station 28 includes a PRACH reception and PRACH preamble detection module 42, a RAR resource determination module 44, and a RAR transmission module 46, each of which is implemented in software. The PRACH reception and PRACH preamble detection module 42 operates to receive, via an associated receiver (not shown) of the base station 28, a PRACH and detect a PRACH preamble on the PRACH, as described above. The RAR resource determination module 44 determines the RAR resource from the index of the selected PRACH preamble, as described above.

The RAR transmission module 46 then transmits a RAR on the RAR resource via an associated transmitter (not shown) of the base station 28. Notably, in some alternative embodiments, rather than determining the RAR resource from the index of the PRACH preamble, the base station 28 determines a control channel on which to transmit an indication of the RAR resource, as described above.

Embodiments described herein can be used to, for example, send a RAR addressing multiple preamble indexes in the same subframe by introducing a mapping between the selected PRACH preamble and the resource used for the RAR or to a grant, or control, channel. In some embodiments, the mapping is a one to one mapping of PRACH preamble indices to RAR resources (or control channels). In other embodiments, each preamble maps to multiple potential RAR resources (or control channels).

While not being limited to any particular advantage, an advantage provided by at least some embodiments of the present disclosure is to facilitate a large number of users on the existing RACH channel, while also facilitating efficient reuse of resources. Other advantages include facilitating the grant of a large number of devices accessed simultaneously even though the bandwidth of each individual device is too small to receive a jointly encoded random access response message. Other advantages will be readily apparent from the description and claims.

The following acronyms are used throughout this disclosure.

μs Microsecond
3GPP $3^{rd}$ Generation Partnership Project
ACF Auto-Correlation Function
ASIC Application Specific Integrated Circuit
CCF Cross-Correlation Function
CM Cubic Metric
CPU Central Processing Unit
CRC Cyclic Redundancy Check
dB Decibel
DCI Downlink Control Information
eNB Enhanced or Evolved Node B
EPDCCH Enhanced Physical Downlink Control Channel
FFT Fast Fourier Transform
FPGA Field Programmable Gate Array
GPS Global Positioning System
Hz Hertz
km Kilometer
LTE Long Term Evolution
M2M Machine-to-Machine
MHz Megahertz
MIB Master Information Block
ms Millisecond
MTC Machine Type Communication
P-RNTI Paging Radio Network Temporary Identifier
PBCH Physical Broadcast Channel
PCI Physical Cell Identifier
PDCCH Physical Downlink Control Channel
PDSCH Physical Downlink Shared Channel
PRACH Physical Random Access Channel
PRB Physical Resource Block
PSS Primary Synchronization Signal
QPSK Quadrature Phase Shift Keying
RA-RNTI Random Access Radio Network Temporary Identifier
RACH Random Access Channel
RAN Radio Access Network
RAR Random Access Response
RNTI Radio Network Temporary Identifier
RRC Radio Resource Control SFN System Frame Number
SIB System Information Block
SSS Secondary Synchronization Signal
TA Time Alignment
TC-RNTI Temporary Cell Radio Access Network Temporary Identifier
TCS Target Cell Selection
TDS Time Domain Scrambler
TGP Transmission Gap Period
TS Technical Specification
UE User Equipment
UL-SCH Uplink Shared Channel
UTRAN Universal Terrestrial Radio Access Network
WCDMA Wideband Code Division Multiple Access Those skilled in the art will recognize improvements and modifications to the embodiments of the present disclosure. All such improvements and modifications are considered within the scope of the concepts disclosed herein and the claims that follow.

What is claimed is:

1. A method of operation of a reduced bandwidth wireless device to perform random access to a cellular communications network, the method comprising:
    transmitting a random access preamble on a physical random access channel;
    determining, from a random access preamble index of the transmitted random access preamble, one of a random access response resource and a channel to monitor for a transmission of an indication of the random access response resource, wherein determining the random access response resource comprises determining the random access response resource from the random access preamble index according to a predefined mapping of random access preamble indices and random access response resources; and
    receiving a random access response on the random access response resource,
    wherein the random access response resource determined from the random access preamble index is valid for a single subframe determined from the random access preamble index, and receiving the random access response on the random access response resource comprises receiving the random access response on the random access response resource in the single subframe.

2. The method of claim 1 wherein the predefined mapping is a function of cell index.

3. The method of claim 1 wherein the predefined mapping is such that two or more of the random access preamble indices are mapping to the random access response resource.

4. The method of claim 1 wherein the predefined mapping is such that the random access preamble index maps to different random access response resources in different subframes.

5. The method of claim 1 wherein determining, from the random access preamble index, one of the random access response resource and the channel to monitor for the transmission of the indication of the random access response resource comprises:
    determining the channel to monitor for the transmission of the indication of the random access response resource from the random access preamble index.

6. The method of claim 5 wherein determining the channel to monitor for the indication of the random access response resource comprises determining the channel to monitor for the indication of the random access response resource according to a predefined mapping.

7. The method of claim 6 wherein the predefined mapping is a predefined mapping between random access preamble indices and radio network temporary identifiers.

8. The method of claim 1 wherein the cellular communications network is a Long Term Evolution, LTE, network, and the random access response resource is a set of physical resource blocks.

9. The method of claim 8 further comprising receiving a random access response configuration from the cellular communications network, the random access response configuration indicating a number of physical resource blocks in the set of physical resource blocks.

10. The method of claim 1 wherein the random access response resource determined from the random access preamble index is valid for multiple subframes determined from the random access preamble index, and receiving the random access response on the random access response resource comprises receiving the random access response on the random access response resource over the multiple subframes.

11. The method of claim 10 wherein the random access response is repeated over the multiple subframes.

12. The method of claim 1 wherein determining, from the random access preamble index, one of the random access response resource and the channel to monitor for the transmission of the indication of the random access response resource comprises determining, from the random access preamble index and a cell index of a cell for which the wireless device is performing random access, the one of the random access response resource and the channel to monitor for the transmission of the indication of the random access response resource.

13. The method of claim 1 wherein the random access response is divided into multiple parts comprising a common part that is common for multiple random access responses to multiple wireless devices, and receiving the random access response on the random access response resource comprises receiving the common part of the random access response on the random access response resource.

14. The method of claim 1 wherein the wireless device is a reduced bandwidth device that receives only a portion of a system bandwidth of a downlink of the cellular communications network.

15. The method of claim 14 wherein the cellular communications network is a Long Term Evolution, LTE, network, and the wireless device does not receive a downlink control channel that spans the system bandwidth.

16. A reduced bandwidth wireless device enabled to perform random access to a cellular communications network, the wireless device comprising:
    a transceiver module;
    a processing module; and
    a memory module storing instructions executable by the processing module whereby the wireless device is operative to:
        transmit, via the transceiver module, a random access preamble on a physical random access channel;
        determine, from a random access preamble index of the transmitted random access preamble, one of a random access response resource and a channel to monitor for a transmission of an indication of the random access response resource, wherein the random access response resource is determined from the random access preamble index according to a predefined mapping of random access preamble indices and random access response resources; and receive, via the transceiver module, a random access response on the random access response resource, wherein the random access response resource determined from the random access preamble index is valid for a single subframe determined from the random access preamble index, and receiving the random access response on the random access response resource comprises receiving the random access response on the random access response resource in the single subframe.

17. The reduced bandwidth wireless device of claim 16 wherein the channel to monitor for the transmission of the indication of the random access response resource is determined from the random access preamble index.

18. The reduced bandwidth wireless device of claim 17 wherein the channel to monitor for the indication of the random access response resource is determined according to a predefined mapping.

19. The reduced bandwidth wireless device of claim 18 wherein the predefined mapping is a predefined mapping between random access preamble indices and radio network temporary identifiers.

20. The reduced bandwidth wireless device of claim 16 wherein the wireless device is a reduced bandwidth device that receives only a portion of a system bandwidth of a downlink of the cellular communications network.

21. A method of operation of a base station to perform random access to a cellular communications network, the method comprising:
    detecting a random access preamble on a physical random access channel;
    determining, from a random access preamble index of the transmitted random access preamble, one of a random access response resource and a channel to transmit an indication of the random access response resource, wherein determining the random access response resource comprises determining the random access response resource from the random access preamble according to a predefined mapping of random access preamble indices and random access response resources; and
    transmitting a random access response on the random access response resource, wherein the random access response resource determined from the random access preamble index is valid for a single subframe determined from the random access preamble index, and transmitting the random access response on the random access response resource comprises transmitting the random access response on the random access response resource in the single subframe.

22. The method of claim 21 wherein the predefined mapping is a function of cell index.

23. The method of claim 21 wherein the predefined mapping is such that two or more of the random access preamble indices are mapping to the random access response resource.

24. The method of claim 21 wherein the predefined mapping is such that the random access preamble index maps to different random access response resources in different subframes.

25. The method of claim 21 wherein determining, from the random access preamble index, one of the random access response resource and the channel on which to transmit the indication of the random access response resource comprises:

determining the channel to transmit the indication of the random access response resource from the random access preamble index; and
transmitting the indication of the random access response resource on the channel.

26. The method of claim 25 wherein determining the channel comprises determining the channel to transmit the indication of the random access response resource according to a predefined mapping.

27. The method of claim 26 wherein the predefined mapping is a predefined mapping between random access preamble indices and radio network temporary identifiers.

28. The method of claim 21 wherein the cellular communications network is a Long Term Evolution, LTE, network, and the random access response resource is a set of physical resource blocks.

29. The method of claim 28 further comprising transmitting a random access response configuration, the random access response configuration indicating a number of physical resource blocks in the set of physical resource blocks.

30. The method of claim 24 wherein the random access response resource determined from the random access preamble index is valid for multiple subframes determined from the random access preamble index, and transmitting the random access response on the random access response resource comprises transmitting the random access response on the random access response resource over the multiple subframes.

31. The method of claim 30 wherein the random access response is repeated over the multiple subframes.

32. A base station that enables random access to a cellular communications network, the base station comprising:
    a transceiver module;
    a processing module; and
    a memory module storing instructions executable by the processing module whereby the base station is operative to:
        detect a random access preamble on a physical random access channel received via the transceiver module;
        determine, from a random access preamble index of the transmitted random access preamble, one of a random access response resource and a channel to transmit an indication of the random access response resource, wherein the random access response resource is determined from the random access preamble index according to a predefined mapping of random access preamble indices and random access response resources; and
        transmit, via the transceiver module, a random access response on the determined random access response resource, wherein the random access response resource determined from the random access preamble index is valid for a single subframe determined from the random access preamble index, and receiving the random access response on the random access response resource comprises receiving the random access response on the random access response resource in the single subframe.

33. The base station of claim 32 wherein the channel to transmit the indication of the random access response resource is determined from the random access preamble index, and, via execution of the instructions, the base station is further operative to transmit, via the transceiver module, the indication of the random access response resource on the channel.

34. The base station of claim 33 wherein the channel to transmit the indication of the random access response resource is determined according to a predefined mapping.

35. The base station of claim 34 wherein the predefined mapping is a predefined mapping between random access preamble indices and radio network temporary identifiers.

* * * * *